United States Patent [19]
Zouras

[11] Patent Number: 5,112,228
[45] Date of Patent: May 12, 1992

[54] VASCULAR MODEL

[75] Inventor: Sally V. Zouras, Sacramento, Calif.

[73] Assignee: Advanced Cardiovascular Systems, Inc., Santa Clara, Calif.

[21] Appl. No.: 702,144

[22] Filed: May 13, 1991

Related U.S. Application Data

[63] Continuation of Ser. No. 435,956, Nov. 13, 1989, abandoned.

[51] Int. Cl.⁵ .................................. G09B 23/30
[52] U.S. Cl. ........................... 434/272; 434/267
[58] Field of Search .................. 434/267, 268, 272

[56] References Cited

U.S. PATENT DOCUMENTS

| | | | |
|---|---|---|---|
| 3,376,659 | 4/1968 | Asin et al. | 434/272 |
| 3,579,858 | 5/1971 | Bentor | 434/272 |
| 4,058,910 | 11/1977 | Funk | 434/272 X |
| 4,332,569 | 6/1982 | Burbank | 434/272 |
| 4,459,113 | 7/1984 | Boscaro Gatti et al. | 434/272 |
| 4,726,772 | 2/1988 | Amplatz | 434/272 |
| 4,907,973 | 3/1990 | Hon | 434/267 X |

*Primary Examiner*—Gene Mancene
*Assistant Examiner*—L. Thomas
*Attorney, Agent, or Firm*—Crosby, Heafey, Roach & May

[57] ABSTRACT

An anatomical model for the testing or demonstration of an intravascular device such as guidewires and dilatation catheters for angioplasty procedures. The model has a plurality of interconnecting passageways simulating the abdominal aorta and a renal artery as well as the left and right iliac and femoral arteries with one or more entry ports therein for the introduction and advancement of intravascular devices into the interconnected passageways.

7 Claims, 1 Drawing Sheet

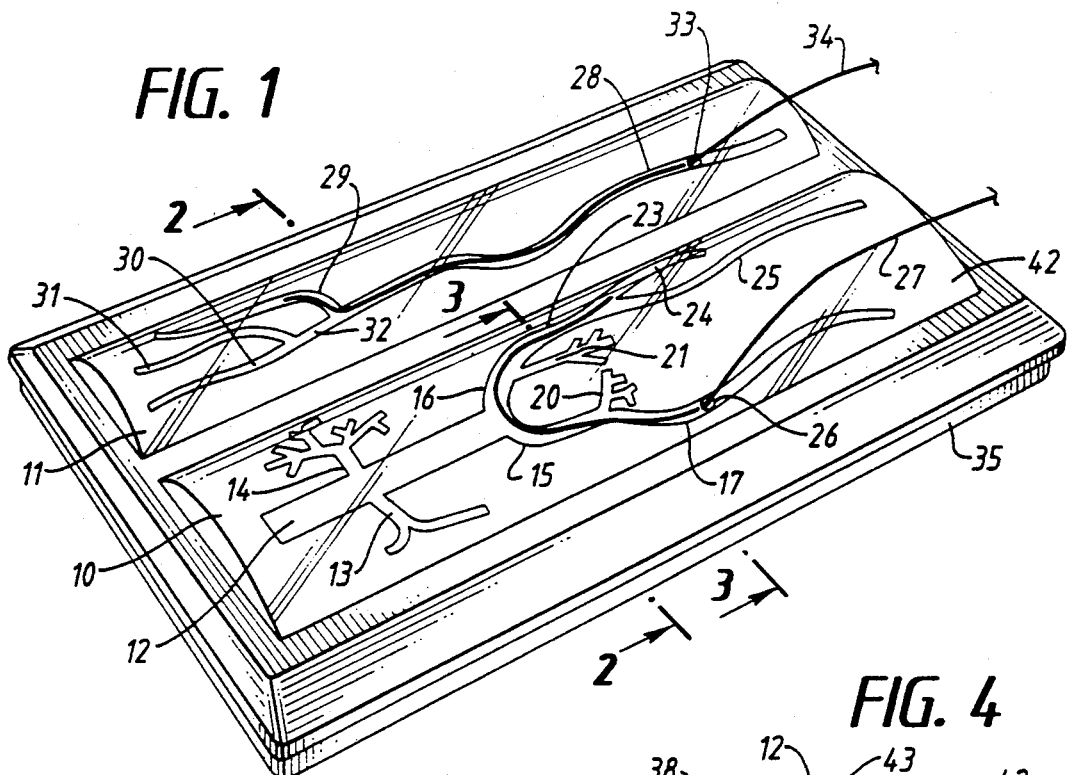
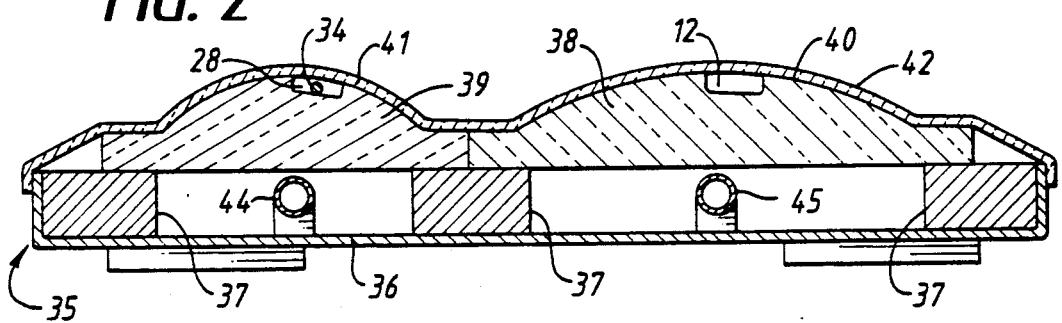
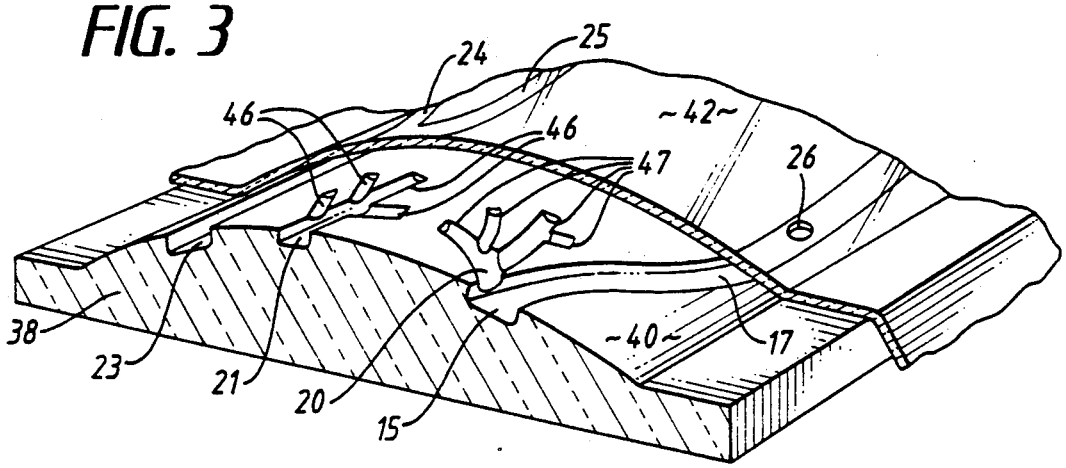

VASCULAR MODEL

This is a continuation of the application Ser. No. 435,956, which was filed on Nov. 13, 1989, now abandoned.

BACKGROUND OF THE INVENTION

This invention generally relates to anatomical models for the testing or the demonstration of intravascular devices such as dilatation catheters.

In the development of dilatation catheters for angioplasty procedures as well as other intravascular devices such as guidewires and the like, there is frequently a need for testing the device or demonstrating that a particular catheter or other vascular device has desired characteristics such as flexibility, torquability and pushability which would render the catheter or device suitable for its intended human use.

Heart models have been employed which have passageways simulating coronary arteries, the aorta and the femoral artery which allow such catheters to be evaluated therein. While the heart models have been very helpful in the testing and demonstration of intravascular devices for the coronary arteries, there are presently no models available for testing or demonstrating intravascular devices suitable for use in arteries located in other areas of the human body, particularly the abdomen and lower extremities.

It is of great importance in anatomical models for testing and demonstration purposes that the model duplicate as closely as possible the anatomical structure of the human body and that the model be manufactured at reasonable cost. The present invention provides an anatomical model satisfying the aforesaid requirements.

SUMMARY OF THE INVENTION

This invention is directed to an anatomical model for the testing and demonstration of intravascular devices and catheters which are intended for use in the arteries of the abdomen and lower extremities of a human patient.

The model in accordance with the present invention has a plurality of interconnected artery-simulating passageways with access ports to allow intravascular devices to be introduced into and advanced through these passageways. The simulated arteries include the abdominal aorta, a renal artery, a common iliac artery, an external and preferably also an internal iliac artery, a femoral artery and a popliteal artery. Preferably, passageways are also included representing anterior and posterior tibial arteries and the peroneal artery. Other passageways representing arteries which branch off from the aforesaid arteries may also be provided.

The interconnecting arterial passageways representing the aforesaid described arterial system may be provided in one elongated section, but it is preferred to separate the simulated arterial system into two sections. The first contains the passageways representing the abdominal aorta, the renal artery, the iliac arteries, the femoral arteries, the popliteal artery and the second section contains passageways representing the femoral artery, the popliteal artery, the anterior tibial artery and the posterior tibial artery and the peroneal artery which branches off from the tibial trunk. Both the first and second sections are provided with entry ports into the passageway simulating the femoral artery for the introduction of intravascular devices to be tested or demonstrated. Other ports, of course, may be provided giving access to the artery-simulating passageways at other locations.

The model of the invention preferably has a body with channels in the surface thereof having the size and location which represent the desired arterial system and also a covering over the upper surface of the body to close off the channels and thus form the artery-simulating passageways. The underside of the covering may also be provided with channels complementary to those in the curved surface of the body to define the passageways. The maximum inner dimensions of the individual passageways should approximate the inner dimensions of the artery simulated. Typical maximum diameters of human arteries are provided in the table below.

| ARTERY SIMULATED | INNER DIAMETER (mm) |
| --- | --- |
| Abdominal Aorta | 12–15 |
| Renal | 6–7 |
| Common Iliac | 8–12 |
| External & Internal Iliac | 6–8 |
| Femoral | 5–6 |
| Popliteal | 4–5 |
| Post. and Ant. Tibial | 3–4 |
| Peroneal | 2–3 |

The upper surface of the body containing the channels preferably has an elongated convex shape with a relatively constant curvature along the length thereof so that the passageways formed therein fairly well represent the three-dimensional array of arteries normally found in the human anatomy. The entry ports are provided in the covering to give access to the underlying channels. If desired, the passageways may be provided with a lubricous coating in order to better simulate the conditions within a human artery.

In tests to demonstrate a catheter or other intravascular device in the model of the invention, the catheter or device is introduced into the desired passageway through the appropriate entry port and then advanced through the passageway to the desired location therein. Both antegrade and retrograde movement through the simulated arteries are contemplated.

These and other advantages of the invention will become more apparent from the following detailed description and the accompanying exemplary drawings

BRIEF DESCRIPTION OF THE DRAWINGS

FIG. 1 is a perspective view of an anatomical model embodying features of the invention.

FIG. 2 is a transverse cross-sectional view taken along the lines 2—2 shown in FIG. 1;

FIG. 3 is a perspective view in section taken along the lines 2—2 shown in FIG. 1.

FIG. 4 is a partial transverse cutaway showing an alternate embodiment of the invention wherein the passageways have circular cross-sectional dimensions.

DETAILED DESCRIPTION OF THE INVENTION

FIG. 1 illustrates an anatomical model embodying features of the invention which represent the abdominal and lower extremity arteries of a human. The model has two sections a large section 10 and a smaller section 11. The larger section 10 of the model has a first passageway 12 simulating the abdominal aorta with a pair of passageways 13 and 14 representing the renal arteries which branch out therefrom in a generally perpendicular direction. The passageway 12 subdivides at one end thereof into two branches 15 and 16, which represent the right and left common iliac arteries, respectively, which generally have an included angle therebetween of about 40° to about 120°. Passageway 15 extends to passageway 17 which represents the right femoral and popliteal arteries. Passageway 20, representing the right internal femoral artery, branches off from passageway 17. Passageway 21 representing the left internal iliac branches from passageway 16 and the latter continues to passageway 23, representing the left femoral artery. Passageway 23 branches into passageways 24 and 25, respectively, simulating the descending genicular and popliteal arteries, respectively. Both of the passageways 20 and 21 are shown with a plurality of smaller passageways branching off from the main passageway thereof to simulate smaller branching arteries. An entry port 26 is provided in communication with passageway 17 to allow an intravascular device or catheter 27 to be introduced and advanced therethrough. While the catheter 27 is shown advanced into passageways 16, 23, and 24, the catheter can be advanced into other simulated arteries, such as through passageway 12 to passageways 13 or 14 which represent the renal arteries.

The smaller section 11 simulates the arteries of the lower extremities, with passageway 28 representing the femoral and popliteal arteries, passageways 29 and 30 representing the posterior and anterior tibial arteries, respectively, passageway 31 represeting the tibial trunk, and passageway 32 simulating the peroneal artery which branches off the tibial trunk. An entry port 33 is provided in communication with the passageway 28 to allow for the introduction and advancement of intravascular device or catheter 34 within the simulated arterial system.

FIG. 2 which is a transverse cross-sectional view taken along the lines 2—2 of the model shown in FIG. 1 illustrates in some detail the construction thereof. Base 35 is generally in the form of a shallow tray 36 with a plurality of pedestals 37 disposed in the tray as shown to support the body 38 and the body 39 which have a plurality of artery-simulating channels in the upper convex surfaces 40 and 41, respectively, thereof. The channels shown in this figure define the passageways 12 and 28, respectively. Catheter 34 is shown within passageway 28. Covering 42, which is clear at least over the channels to facilitate observation inside the passageway, closes the channels in the upper surfaces 40 and 41 to completely form the artery-simulating passageways. As shown in FIG. 4, the underside of the covering 42 above the channels can be provided with a corresponding channel 43 to further define the passageway. Moreover, while the passageways are shown as being rectangular in cross section in FIGS. 1-3, they may, of course, be made circular in cross section to more accurately simulate a human artery and a complementary channel may be provided in the lower surface of the covering 42 as shown in FIG. 4. Lighting such as fluorescent lamps 44 and 45 can be provided under the bodies 38 and 39 to highlight the passageways therein and thereby further facilitate the observation of intravascular catheters within these passageways.

FIG. 3 illustrates additional details of the model and particularly the smaller channels 46 and 47 in the upper surface 40 of the body 38.

The bodies 38 and 39 and the covering 42 are preferably formed of a suitable plastic material such as polycarbonate or an acrylate, although glass and other similar materials may also be employed.

While the invention has been described herein in terms of certain preferred embodiments, modifications can be made thereto, as be will appreciated by those skilled in the art a without departing from the scope thereof.

What is claimed is:

1. An anatomical model for testing or demonstrating intravascular devices adapted to be used in arteries in the abdomen and lower extremities of a human which include at least the abdominal aorta, the renal artery, the left and right common iliac arteries, the left and right exterior iliac arteries, the left and right femoral arteries, said model having:
   a) a plurality of interconnected artery-simulating passageways with at least one entry port for the introduction of intravascular devices into the artery-simulating passageways and the advancement of the device therein for testing or demonstration purposes;
   b) the artery-simulating passageways provided including a relatively large diameter first passageway simulating the abdominal aorta, at least one second passageway extending generally perpendicular from the first passageway simulating a renal artery, third and fourth passageways extending from an end of the first passageway which simulates the left and right common iliac arteries, the right and left external iliac artery, the femoral artery; and
   c) a body having a plurality of interconnected open-top channels in the upper surface thereof and means to cover the open-top channels to thereby define the artery-simulating passageways.

2. The anatomical model of claim 1 wherein the third and fourth passageways diverge away from each other at an included angle of about 40° to about 120°.

3. The anatomical model of claim 1 wherein the first passageway has a maximum dimension within the range of about 12 to about 15 mm, the second passageway has a maximum dimension within the range of about 6 to about 7 mm, and the third and fourth passageways have maximum dimensions within the range of about 5 to about 8 mm.

4. An anatomical model representing a portion of a human arterial system including a relatively flat body having a plurality of interconnected open-top channels in the upper surface thereof and a covering over the upper surface to close the open channels to thereby define the artery-simulating passageways.

5. The anatomical model of claim 4 wherein the upper surface of the body is convex.

6. The anatomical model of claim 5 wherein the upper convex surface is elongated and has a constant radius of curvature along the length thereof.

7. The anatomical model of claim 4 wherein the covering has channels formed in the underside thereof complementary to the channels in the upper surface of the body which define the artery simulating passageways.

* * * * *